United States Patent [19]

Tichy et al.

[11] 4,039,765
[45] Aug. 2, 1977

[54] HEADSET WITH ADJUSTABLE MICROPHONE SUPPORT

[75] Inventors: Thomas H. Tichy, Mount Prospect; Raymond W. Collins, Schaumburg, both of Ill.

[73] Assignee: Shure Brothers, Inc., Evanston, Ill.

[21] Appl. No.: 735,622

[22] Filed: Oct. 26, 1976

[51] Int. Cl.² ............................................. H04M 1/05
[52] U.S. Cl. .................................. 179/156 A; 179/178
[58] Field of Search ............................ 179/156 A, 178

[56] References Cited

U.S. PATENT DOCUMENTS

| 2,025,398 | 12/1935 | Pocock et al. | 179/156 A |
| 3,588,384 | 6/1971 | Negley | 179/156 A |

FOREIGN PATENT DOCUMENTS

| 306,800 | 7/1955 | Switzerland | 179/156 A |

Primary Examiner—William C. Cooper
Attorney, Agent, or Firm—Allegretti, Newitt, Witcoff & McAndrews

[57] ABSTRACT

A communications headset in which a unidirectional microphone at the end of a support boom is adjustably secured in a position selected by the wearer. The support boom is clamped under adjustable compression in a ball-and-socket arrangement which, at reduced compression, allows the boom to be moved longitudinally, pivoted about its axis, or pivoted about the center of the ball. The wearer turns a knob to compress the ball-and-socket joint to secure the boom in the position desired. A tube transmitting sound from the receiver to an ear plug is adjustably attached to the headset by means of a second ball-and-socket joint. A pivoting clamp attached to a pivoting temple member permits the microphone support assembly to be switched from one side of the head to the other as desired.

6 Claims, 7 Drawing Figures

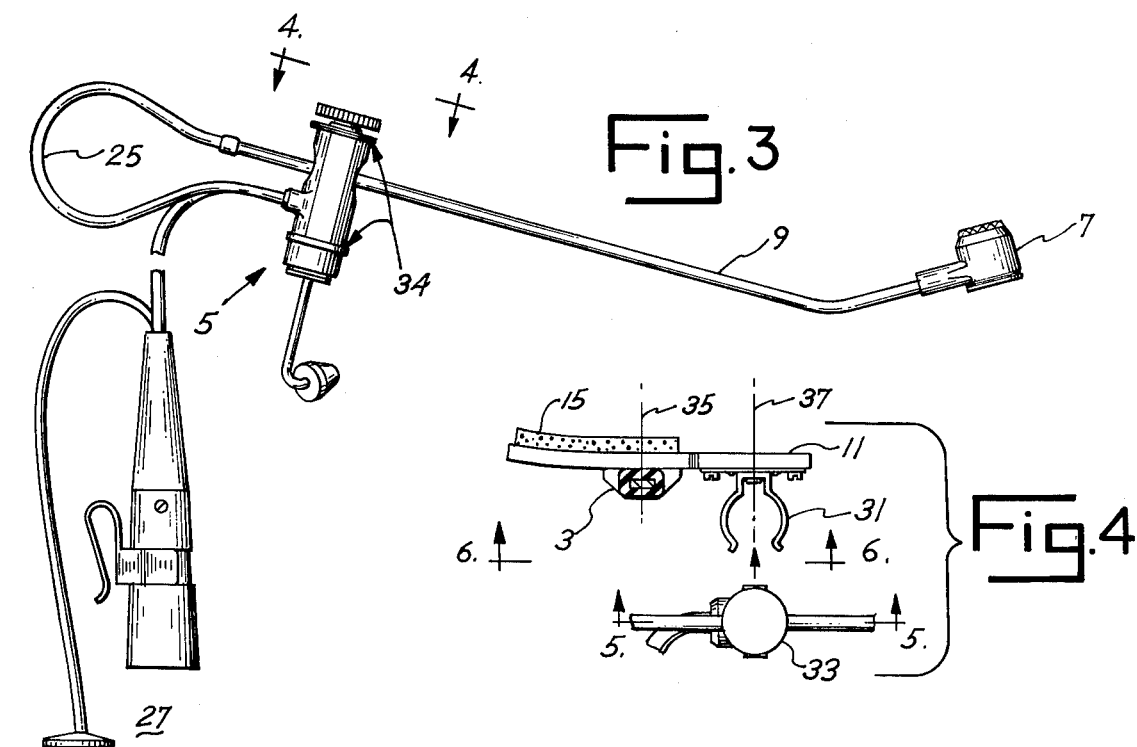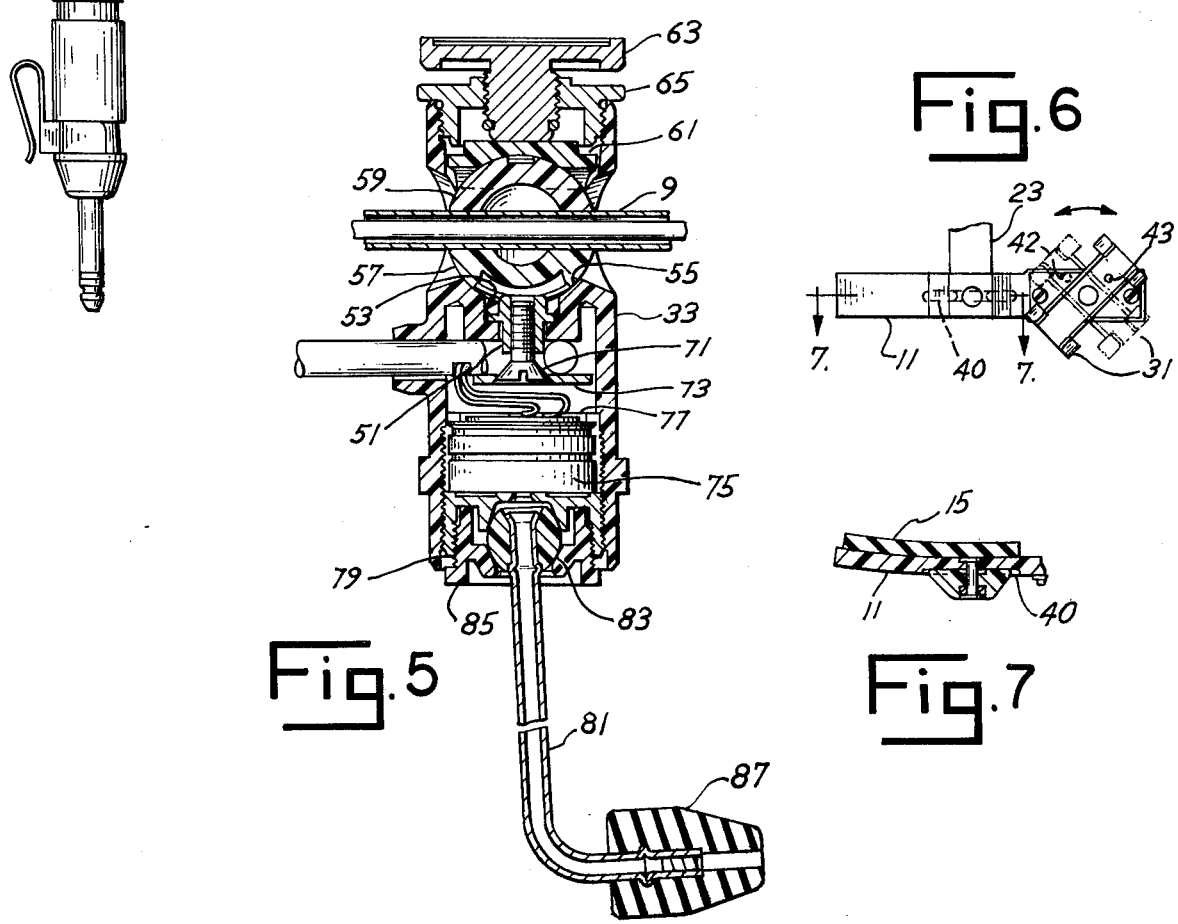

HEADSET WITH ADJUSTABLE MICROPHONE SUPPORT

BACKGROUND AND SUMMARY OF THE INVENTION

This invention is am improved microphone-supporting headset of the type used in connection with communications, recording and broadcasting systems.

The headset consists of a resilient headband adapted to be worn over the head, a substantially rigid microphone boom having a sound pick-up positioned at its outer end, and an arrangement for securing the boom in a position selected by the wearer.

The boom passes between two hemispherical members which together form the ball portion of a ball-and-socket joint. Recesses in the two hemispherical members face one another and together form a passageway for slidably receiving the boom.

Two bearing members having opposing concave surfaces form the socket portion of the ball-and-socket joint. A knob applies an adjustable clamping force to the bearing members, placing both the ball and the boom under adjustable compression. When the knob is loosened, the boom is free to swing in any direction about the center of the ball, to be slidably extended or retracted, and to be pivoted about its own longitudinal axis, allowing a unidirectional microphone to be precisely positioned and pointed in the desired direction. Tightening the knob secures the microphone in the desired position.

An accoustic tube, carrying sound from the receiver to an ear plug is joined with the headset by a ball-and-socket joint.

Preferably, the microphone and earpiece support assembly is removably attached to a temple member by means of a pivoting bracket, the temple member in turn being pivotally attached to one end of the headband. This arrangement allows the support assembly to be worn on either the right or left side of the head, as the wearer chooses.

BRIEF DESCRIPTION OF THE DRAWINGS

FIG. 3 is a side elevational view of the microphone boom, the boom support structure and the electrical cord assembly of the headset;

FIG. 4 is a top view of the headband, temple member, and boom support structure illustrating how the boom support sturcture is removably attached to the temple member;

FIG. 5 is a cross-sectional view of the boom support structure taken along the line 5—5 of FIG. 4;

FIG. 6 is a side elevational view of the temple member; and

FIG. 7 is a cross-sectional view of the pivoting connection between the headband and temple member taken along line 7—7 of FIG. 6.

DETAILED DESCRIPTION OF THE INVENTION

Figure 1:
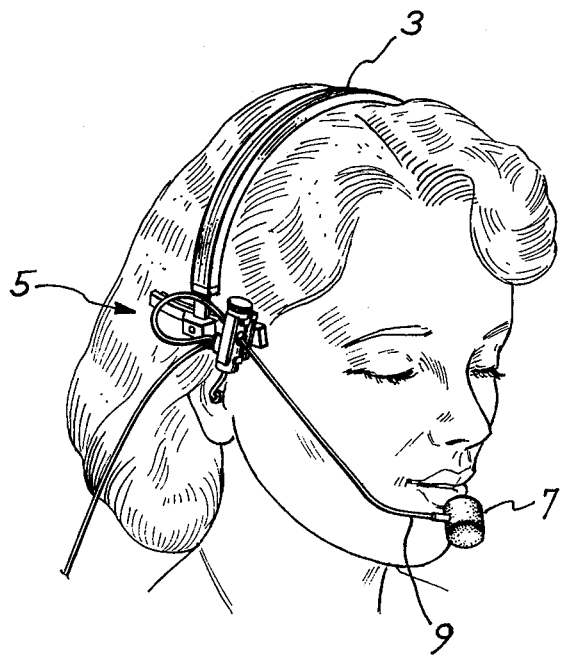
FIG. 1 shows a headset which employs the principles of the present invention in position on the head of a user.
Figure 2:
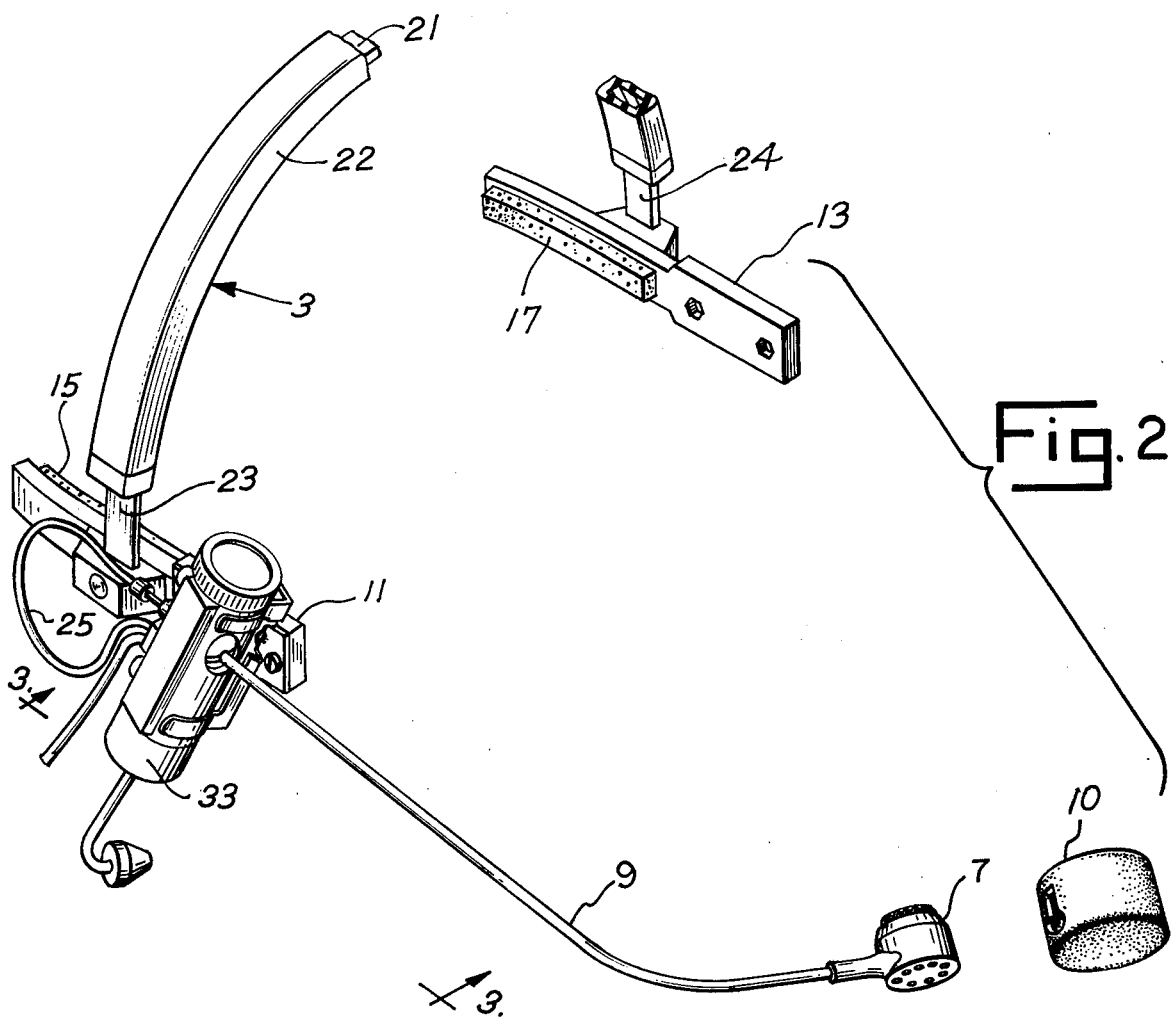
FIG. 2 is an enlarged perspective view of the headset.

As seen in FIGS. 1 and 2, the headband indicated generally at 3 is worn over the top of the head and a microphone and earpiece support structure indicated generally at 5 is attached to one end of the headband. A unidirectional microphone 7 is suspended in front of the wearer's mouth at the end of a supporting boom 9. A windscreen cover 10, an optional accessory used to suppress wind noise during outdoor use, is formed from an open, deformable foam material, such as polyurethane, and stretches over the microphone.

As shown in FIG. 2, temple members 11 and 13 are attached to the respective ends of the headband 3. Foam rubber comfort pads 15 and 17 are attached by an adhesive to the inner faces of temple members 11 and 13 respectively. Also, for the wearer's comfort, the resilient, spring steel band 21 of headband 3 is covered with a soft rubber sheath 22. Temple members 11 and 13 are attached to the ends of spring steel extension bands 23 and 24 which may be extended or retracted to conform to differing head sizes.

As shown in FIG. 3, the microphone support boom 9 is a hollow tube which passes through the support structure 5 and acts as a conduit for the microphone cable 25. The cable 25 extends in a short loop from the inner end of the boom 9 to the mounting structure 5 to allow the boom 9 to be moved longitudinally. A highly flexible transmission cable and plug assembly 27 shown in FIG. 3 provides the electrical connections to communications, recording or other system with which the headset is to be used.

As seen in FIG. 4, a bracket 31 secures the generally cylindrical pivot housing 33 to the temple member 11. The cross-sectional shape of the bracket 31 conforms to that of the housing 33 to secure the housing against turning motion once it is snapped into position. In addition, the edges of bracket 31 abut the raised shoulders (indicated at 34 in FIG. 3) of housing 33 to secure it against longitudinal motion. Thus, the housing 33 "fits" into the bracket 31 four ways. The temple member 11 is pivotally mounted on headband 3 so that it can be rotated about the axis 35. A tongue-and-groove detent seen at 40 in FIG. 6 holds the temple member in one of two stable positions, both perpendicular to the plane of headband 3. Likewise, the bracket 31 is pivotally mounted on the temple member 11 for rotation about axis 37 (shown in FIG. 4). Detents 42 and 43 seen in FIG. 6 secure the bracket 33 in two selectable stable positions. For each, the long dimension of the bracket is at an approximately 45° angle to the long dimension of the temple member.

The pivoting relationship of the temple member 11 and the bracket 31, together with the relocatability of the housing 33 with respect to the bracket 31, make it easy to change the position of the microphone support structure from one side of the head to the other. To accomplish this, both temple members 11 and 13 are turned 180°, and the bracket 31 is rotated 90° to its other detent position. The housing 33 is then unsnapped from bracket 31, rotated 180° about the axis of the boom 9, and snapped back into position.

The interior details of the microphone and earpiece mounting structure are shown in FIG. 5 of the drawing. The structure is assembled as follows:

Retaining nut 51 is first fastened to the housing 33 with a bead of adhesive applied to the area indicated at 53. The housing 33 includes an inner concave surface 55 which forms a seat for a lower, hemispherical half-ball 57. The upper hemispherical half-ball 59 is seated against the concave surface of adjustment spacer 51 which is clamped against the half-ball 59 under variable compression by the adjusting knob 63. Knob 63 is threaded into the end cap 65 which, in turn, is threaded into the housing 33.

A screw 71 secures cable retainer 73 to the housing 33. A sound-producing receiver cartridge 75 bears against the washer 77 and is held in position by end plug 79 which is threaded into housing 33.

Ear tube 81 is attached to the housing 33 by means of a ball-and-socket pivot assembly. Ear tube 81 is fitted with a ball 83 at its inner end, the ball 83 being clamped with a socket formed by end plug 79 and the retainer 85 which is threaded into the end plug 79. An ear plug 87 is fitted over the outer end of the ear tube 81.

The opposing planar faces of ball-halves 57 and 59 are recessed and these recesses together form a passageway which receives the microphone support tube 9. The tube 9 holds the two ball-halves in spaced relation and is clamped between the two when the knob 63 is tightened. When knob 63 is loosened, the tube 9 is free to slide longitudinally and to pivot about its longitudinal axis. Similarly, when the ball formed by ball-halves 57 and 59 is not tightly clamped within the socket formed by surface 55 of the housing 33 and the concave surface of adjustment spacer 61, the support tube 9 may be rotated about the center of the ball in any direction desired. Retightening the knob 63 secures the support tube 9 in the position selected by the wearer.

It is to be understood that the specific headset which has been described is merely illustrative of one application of the principles of the present invention and that numerous modifications may be made to the arrangement described without departing from the true spirit and scope of the invention.

What is claimed is:

1. A communications headset comprising:
    a resilient headband adapted to be worn over the head,
    a substantially rigid microphone boom having a sound pick-up at one end thereof, and adjustable mounting means attached to said headband for securely supporting said sound pick-up in a position selected by the wearer, said adjustable mounting means comprising, in combination,
    first and second hemispherical members having substantially equal curvatures together forming the ball of a ball-and-socket joint, at least one of said hemispherical members being recessed to form a passageway for slidably receiving said boom,
    first and second bearing members having opposing surfaces forming the socket of said ball-and-socket joint,
    and means for applying an adjustable clamping force to said bearing members to place said ball and said boom under variable compression.

2. A communications headset as set forth in claim 1 wherein said sound pick-up is a unidirectional microphone and wherein said boom has a circular cross-section at least at said ball-and-socket joint to permit the wearer to pivotally position said microphone when said adjustable clamping force is reduced.

3. A communications headset as set forth in claim 1 wherein said adjustable mounting means are removably secured to said headband by means of a clamp pivotally mounted on said headband.

4. A microphone-supporting headset comprising, in combination,
    a resilient, semicircular headband adapted to be worn on the head,
    a temple member pivotally attached to said headband for rotation about a first axis,
    a mounting bracket pivotally attached to said temple member for rotation about a second axis spaced from said first axis, and
    a microphone support removably attached to said temple member by means of said mounting bracket.

5. The headset of claim 4 including first detent means for securing said temple member in two stable angular positions with respect to said headband and second detent means for securing said mounting bracket in two stable angular positions with respect to said temple member.

6. A headset as set forth in claim 4 including an ear tube pivotally mounted on said microphone support.

* * * * *